Oct. 14, 1952 J. H. WILLIAMS 2,613,569
MECHANISM FOR TEACHING THE PIANO
Filed March 1, 1948 4 Sheets-Sheet 1
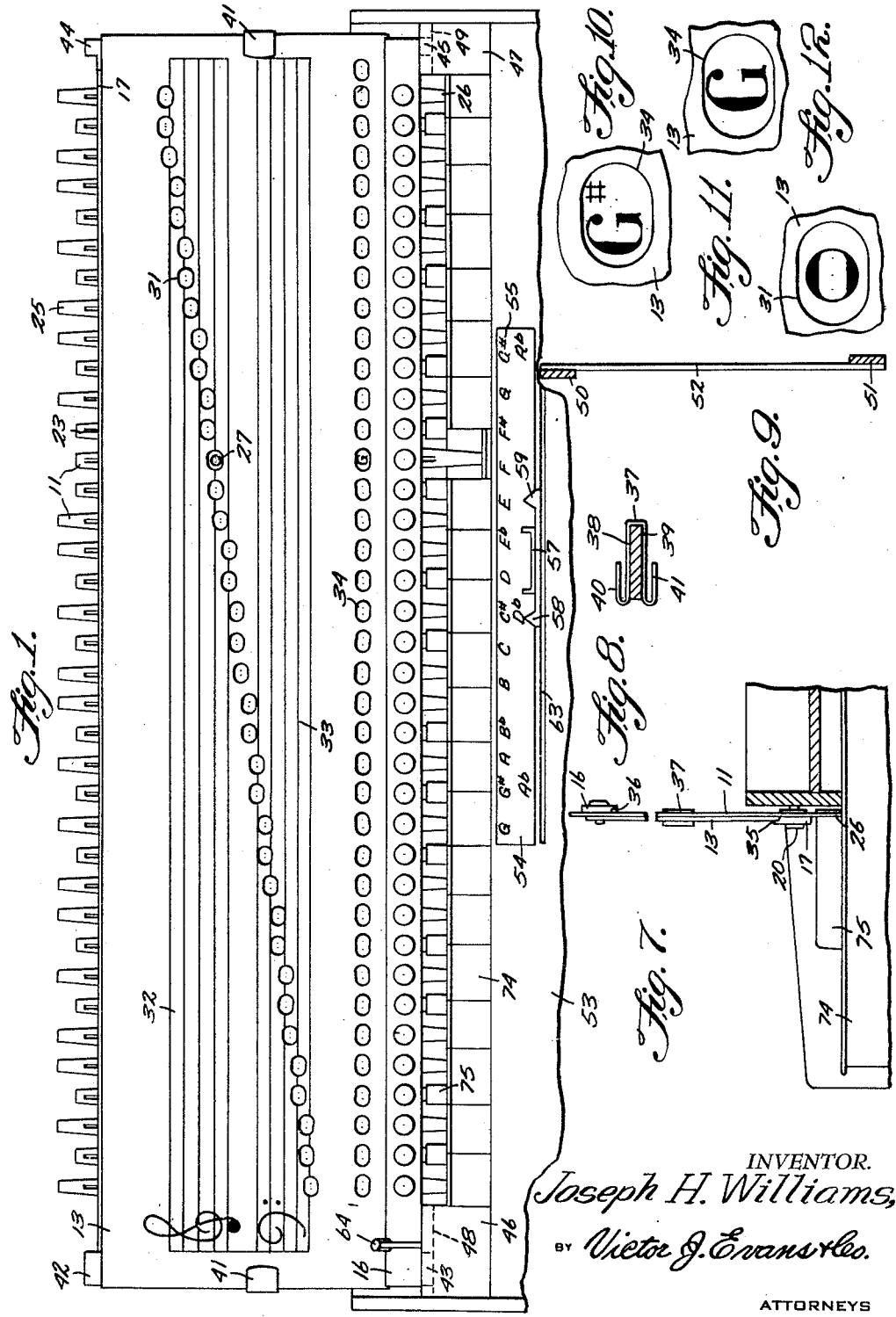
INVENTOR.
Joseph H. Williams,
BY Victor J. Evans & Co.
ATTORNEYS

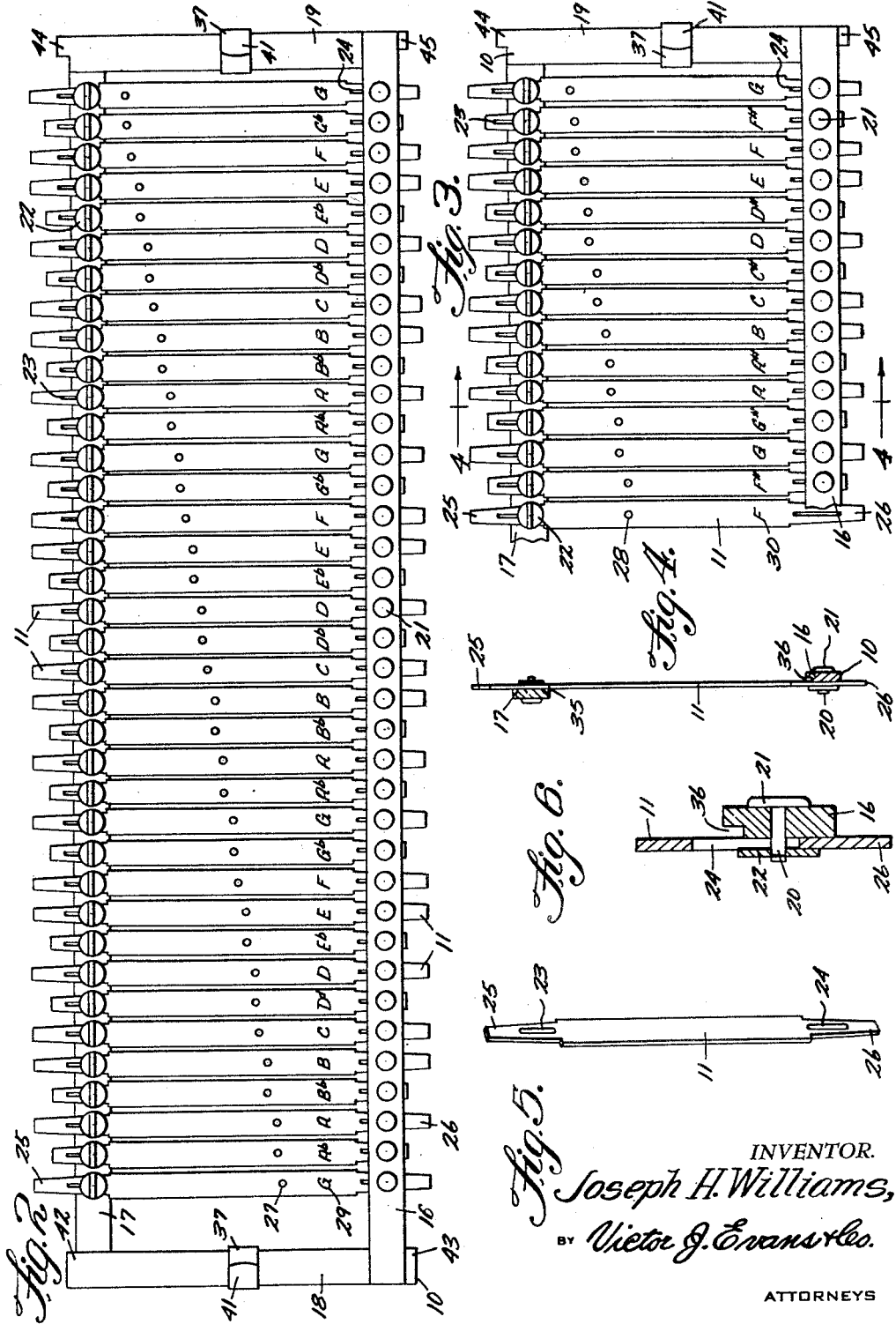

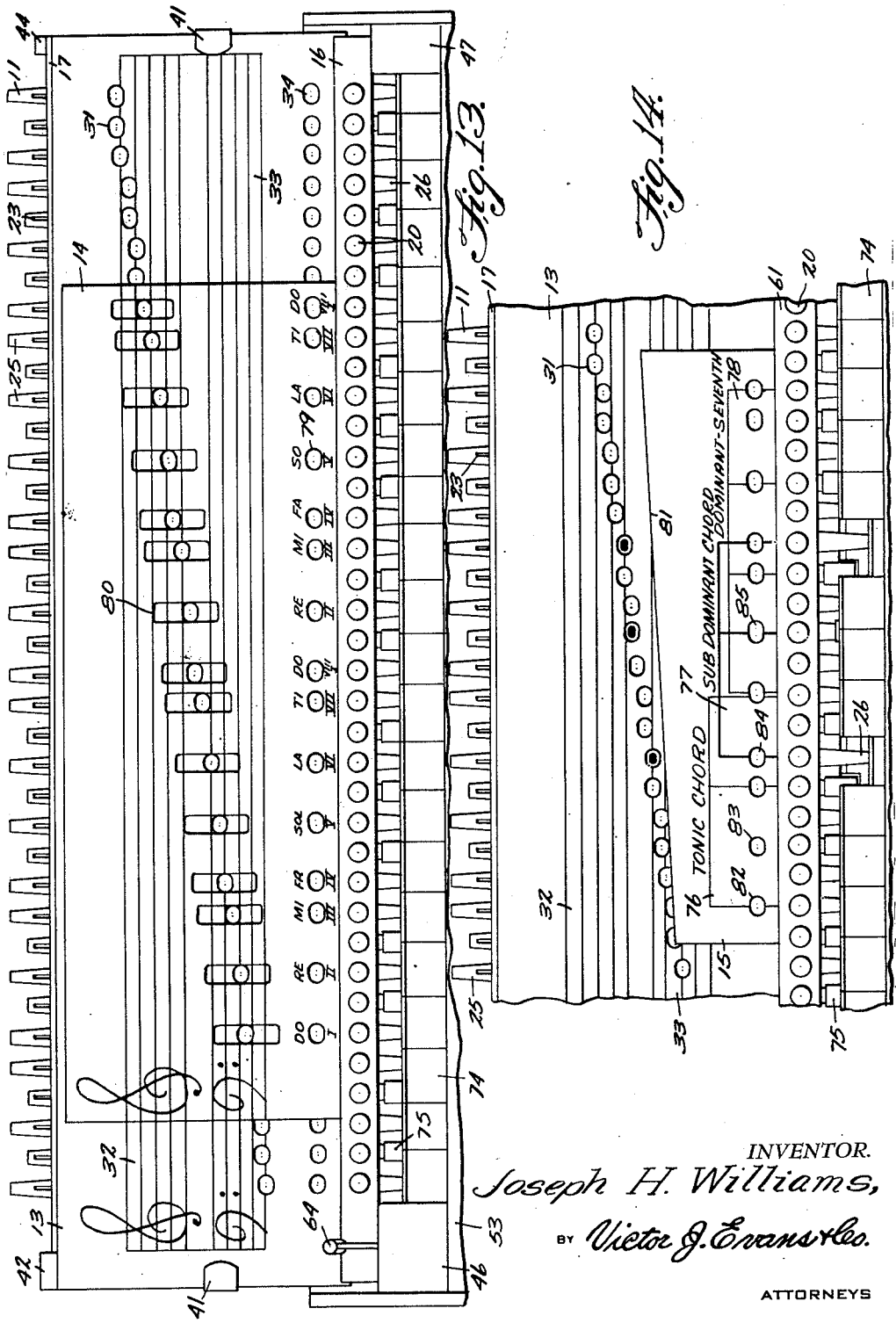

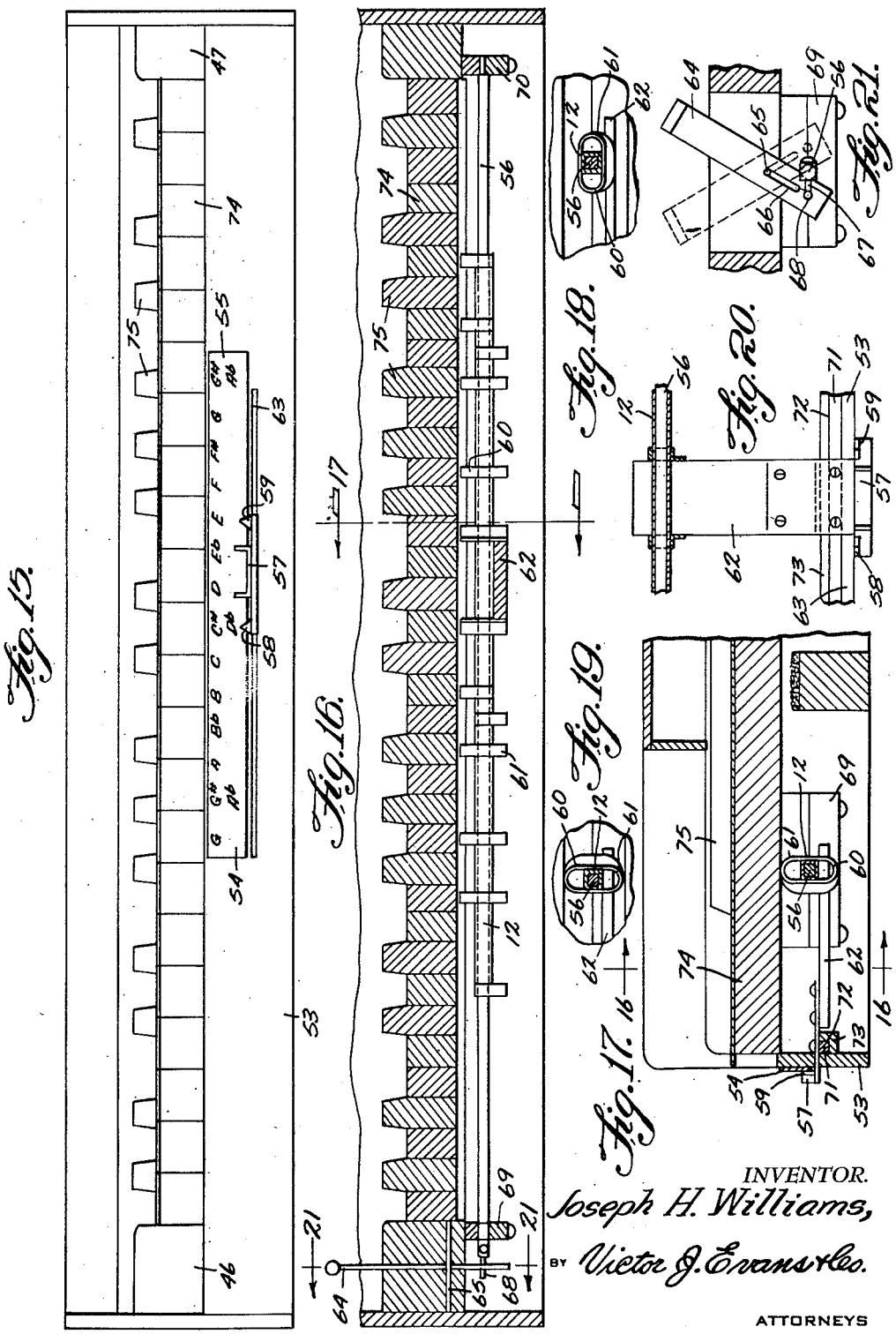

Patented Oct. 14, 1952

2,613,569

UNITED STATES PATENT OFFICE 2,613,569

MECHANISM FOR TEACHING THE PIANO

Joseph H. Williams, Alameda, Calif.

Application March 1, 1948, Serial No. 12,357

3 Claims. (Cl. 84—471)

This invention relates to devices for facilitating instruction on musical instruments and in particular an attachment for a piano that may be stood upright over the keys to indicate a key that is struck, and which includes major scale transposing and chord guides, and means for holding some of the keys when it is desired to train a player to use only certain keys in some scales.

This invention is an improvement over the instruction device of my prior patent, Number 1,564,392, in that instead of using the heavy bars on the keys which caused an unnatural touch the construction is improved so that relatively thin light weight slides are used on the keys, and the key holding means is actuated by a small lever which eliminates the ends of the bars protruding beyond the ends of the keyboard. The invention also includes other improvements in the charts and guides and structural details as hereinafter described.

The purpose of this invention is to provide improved means for indicating the name of each piano key as the key is operated and to simultaneously locate the key note upon the staff so that a player will easily and quickly learn the names of the keys and also the position upon the staff of the note played.

In instructing beginners from piano instruction books it is difficult, particularly for a child to visualize the relative positions of the keys on the actual instrument and it is also difficult to associate the positions for the keys with the notes on the treble and bass staffs. With this thought in mind this invention includes a frame having a plurality of vertically positioned slides therein with notes and letters denoting the keys of a piano on the slides and means for positioning the frame on a piano with each slide resting on a key, and with superimposed charts having openings therethrough through which the notes and letters of the keys show as the key is struck.

The invention also includes means for holding certain keys of the piano so that when a player is practising the scale of A sharp minor, as an illustration, all of the keys of the piano will be locked except the keys used in playing this particular scale. To accomplish this result the invention includes a slider mounted on a bar below the outer ends of the keys with coacting groups of lugs on the slider, means for adjusting the position of the slider, and means for actuating the slider to operative and inoperative positions.

The object of this invention is, therefore, to provide improved means for visually indicating the name of a key played, the position of the note corresponding therewith on the staff, and means for holding some of the keys by mechanically operating instrumentalities.

Another object of the invention is to provide a mechanical device for indicating the keys of a piano as they are played which may readily be positioned on a keyboard.

Another object of the invention is to provide a mechanically operative device for visually indicating the keys of a piano as the keys are played in which a major scale transposing guide and also a chord guide may be superimposed thereon and used in combination therewith.

Another object of the invention is to provide means for holding some of the keys of a piano to prevent playing thereof that may be incorporated in the keyboard without protruding at the ends thereof.

A further object of the invention is to provide a mechanically operating device for indicating the keys of a piano as the keys are played, and also means for holding some of the keys, which are of simple and economical constructions.

With these and other objects and advantages in view the invention consists of the new and novel combinations, constructions, and arrangement of parts as hereinafter more fully described, set forth in the claims appended hereto, and disclosed in the accompanying drawings, forming part hereof, wherein:

Figure 1 is a view showing a front elevation of the key indicating device with a chart showing a staff thereon and openings therethrough corresponding with the keys.

Figure 2 is a view showing a front elevation of the mounting frame with the key actuated slides thereon, with the slides lettered for playing flats.

Figure 3 is a similar view showing the opposite side of the frame wherein the slides are lettered for playing sharps, and in which part is broken away.

Figure 4 is a cross section through the frame taken on line 4—4 of Figure 3.

Figure 5 is a detail showing one of the slides with the letters omitted.

Figure 6 is a detail on an enlarged scale showing a section through one side of the frame.

Figure 7 is a detail showing the device positioned on a keyboard with parts in elevation and parts in section and also with parts broken away.

Figure 8 is a detail showing one of the chart or guide holding clips used on the ends of the frame with the frame shown in section.

Figure 9 is also a cross section through the frame similar to that shown in Figure 4, illustrating a modification wherein the chart holding slots are omitted in the inner edges of the side bars.

Figure 10 is a detail showing indicia such as G♯ showing through an opening in the chart, with parts broken away.

Figure 11 is a similar view showing G natural, showing through an opening in the chart.

Figure 12 is a similar view showing a note showing through an opening in the chart.

Figure 13 is a view similar to that shown in Figure 1 showing a major scale transposing guide in combination with the staff chart.

Figure 14 is a similar view with parts broken away showing a chord guide in combination with the staff chart.

Figure 15 is a view similar to that shown in Figure 1 illustrating a practise piano keyboard with the key indicating frame omitted, and with the key locking indicator chart thereon.

Figure 16 is a longitudinal section through the keyboard shown in Figure 15, taken on line 16—16 of Figure 17.

Figure 17 is a cross section through the keyboard with parts broken away, taken on line 17—17 of Figure 16.

Figure 18 is a detail showing one of the key holding lugs of the slider positioned on the bar under the keys.

Figure 19 is a similar view showing the lug turned through an angle of 90° wherein one end thereof is in contact with the lower surface of a key.

Figure 20 is a detail with parts shown in section illustrating the slider actuating grip extending through the front of the piano.

Figure 21 is a detail showing a section through one end of the keyboard taken on line 21—21 showing the slider bar actuating lever, and with parts broken away.

Referring now to the drawings wherein like reference characters denote corresponding parts the improved piano instruction device of this invention includes a frame 10 having slides 11 slidably mounted thereon, a key holding slider 12, and suitable charts including a staff chart 13, a major scale transposing guide 14, and a chord guide 15.

The frame 10 is formed with side bars 16 and 17, with the ends connected by vertically disposed bars 18 and 19, and with the bars 16 and 17 provided with pins 20 having heads 21 and locking nuts 22, as shown in Figure 6, by which the slides or sliding bars 11 are slidably mounted on the side bars through slots 23 and 24, as shown in Figure 5. The slides are formed with relatively narrow key engaging ends 25 and 26 which extend beyond the bars, and notes 27 on one side and 28 on the other are provided on the upper surfaces of the slides with indicia 29 and 30 on the sides, respectively, designating the keys. The notes are positioned to show through openings 31 of the treble and bass staffs 32 and 33, of the chart 13, and the indicia are positioned to show through a row of openings 34, also on the chart, with the chart positioned on a keyboard of a piano, as shown in Figure 1. The inner edges of the side bars 16 and 17 are formed with notches 35 and 36, respectively, to receive the edges of the charts positioned against the slides, and the ends 18 and 19 are provided with U-shape clips 37 having arms 38 and 39 with inwardly extending ends 40 and 41 for holding the ends of the charts, as shown in Figures 1 and 8.

The vertically disposed bar 18 is formed with extending ends 42 and 43, and the bar 19 with ends 44 and 45, which hold the frame substantially vertical from end pieces 46 and 47 of a piano, the said extending ends being positioned in slots 48 and 49 of the end pieces respectively, as shown in Figure 1.

In the design shown in Figure 9 the frame is formed with side bars 50 and 51 with the ends connected by bars 52 wherein the notches in the inner edges are omitted, and it will be understood that the frame may be formed of any suitable design.

The front panel 53 of the piano is provided with a key holding indicator chart 54, as shown in Figure 15, and this chart is provided with indicia 55 indicating certain scales. The slider 12, which is slidably mounted on a square bar 56 is actuated by a finger grip 57 that extends through the panel 53, as shown in Figure 20, and the grip is formed with points 58 and 59 that are positioned to register with the indicia on the chart 54 to set the lugs 60 and 61 of the slider under certain keys when a player is playing a particular scale. The grip 57 is mounted on the end of an arm 62 and extends through a slot 63 in the panel 53. The lugs 60 and 61 are formed as shown in Figures 18 and 19, and the lugs are turned over by a lever 64 which is pivotally and slidably mounted on a pin 65 through a slot 66, as shown in Figure 21, wherein the lower end of the lever is pivotally attached to the end of an arm 67 by a pin 68, and the arm extends from the end of the bar 56. In operation, the lever 64 is first drawn upward, and then moved from one position to another to place the lugs in neutral positions, and then when it is desired to hold the keys, the lever is pressed downward to the position as shown in Figure 21, in which the shaft or bar 56 is positioned so that the lugs 60 will engage the under surfaces of the keys of the piano. The bar 56 is pivotally mounted in bearings 69 and 70, and the outer end of the slider actuating arm 62 is provided with a guide 71 that is slidably mounted in a slot 72 in a bar 73, as shown in Figure 17.

In use the frame with the slides thereon is positioned on the keyboard of a piano with the lower ends of the slides resting on the keys 74 and 75, and as a key is struck its corresponding note and letter designating the key appear in the respective openings in the chart 13, wherein the player may instantly ascertain the position of the note on the staff and at the same time see the name of the key. For some uses it is desired to use the major scale transposing guide 14 or the chord guide 15, and other charts or guides such as the tonic chord chart 76, the subdominant chord chart 77, or the dominant seventh chart 78 may be used. The guide 14 is provided with elongated slots 79 on the staff, and a row of openings 80 which are positioned to register with the openings 34 of the chart 13, and the chord guide 15 is formed with a sloping upper surface 81 and a row of openings 82 corresponding with the openings 34 of the chart 13. The charts 76, 77, and 78 are also provided with openings 83, 84 and 85 respectively, to correspond with the openings 34 of the chart 13, and through which the letters designating the keys are visible as the key is pressed down.

It will be understood that other changes may be made in the design and arrangement of the parts without departing from the spirit of the invention.

What is claimed is:

1. In a key indicating frame for piano instruction, the combination which comprises a frame having horizontally disposed parallel side bars and vertically positioned end bars extended across the keyboard of a piano, vertically aligned pins with heads thereon positioned at equally spaced points on the said horizontally disposed side bars and centered on the keys of the keyboard of a piano, parallel sliding bars with tapered ends and having elongated slots extended through the face thereof adjacent the said ends and positioned on the pins of the horizontally disposed bars with the pins in the slots thereof and with the head of the pins extended on the faces of the bars, a chart having a staff thereon with an upwardly sloping row of openings positioned on and between the lines of the bass and treble clefs of the staff and a horizontally disposed row of openings spaced from the lower edge thereof, the openings of both rows spaced to correspond with the pins of the horizontally disposed bars of the frame, said sliding bars having note designations thereon positioned to register with the said upwardly sloping row of openings and having letters thereon designating the names of the keys of the piano positioned to register with the said horizontally disposed row of openings, a major scale transfer guide having vertically extended elongated openings therethrough positioned on the chart having the staff thereon and said elongated openings being positioned to correspond with the openings of the sloping row of openings of the chart, a chord guide having groups of openings therethrough corresponding with chords of musical compositions positioned against said major scale transfer guide and means mounting the frame on a piano.

2. In a key indicating frame for piano instruction, the combination which comprises a frame having horizontally disposed parallel side bars and vertically positioned end bars extended across the keyboard of a piano, vertically aligned pins with heads thereon positioned at equally spaced points on the said horizontally disposed side bars and centered on the keys of the keyboard of a piano, parallel sliding bars with tapered ends and having elongated slots extended through the face thereof adjacent the said ends and positioned on the pins of the horizontally disposed bars with the pins in the slots thereof and with the head of the pins extended on the faces of the bars, a chart having a staff thereon with an upwardly sloping row of openings positioned on and between the lines of the bass and treble clefs of the staff and a horizontally disposed row of openings spaced from the lower edge thereof, the openings of both rows spaced to correspond with the pins of the horizontally disposed bars of the frame, said sliding bars having note designations thereon positioned to register with the said upwardly sloping row of openings and having letters thereon designating the names of the keys of the piano positioned to register with the said horizontally disposed row of openings, a major scale transfer guide having vertically extended elongated openings therethrough positioned on the chart having the staff thereon and said elongated openings being positioned to correspond with the openings of the sloping row of the openings of the chart, a chord guide having groups of openings therethrough corresponding with chords of musical compositions positioned against said major scale transfer guide, a transversely disposed shaft extended across the keyboard and positioned below the keys thereof, a sleeve slidably mounted on said shaft having a plurality of sets of cams thereon corresponding with the keys of different keys of a piano, means adjusting the cams along the shaft, and means turning the said sleeves for setting the cams to neutral positions and with one of said sets of cams engaging keys of the keyboard for preventing actuation of said keys.

3. A piano key retainer comprising a square shaft for use on a piano and adapted to be positioned transversely of and below the keys thereof, an elongated tubular slider mounted on said shaft and having groups of lugs thereon, an arm carried by said slider and positioned to extend through the case of a piano in which the shaft is positioned for actuating the slider longitudinally of said shaft, and a lever adapted to be slidably and pivotally mounted in the case of the piano for rotating the said shaft whereby lugs of the groups selectively engage the keys of the piano for preventing operation of certain of the keys.

JOSEPH H. WILLIAMS.

REFERENCES CITED

The following references are of record in the file of this patent:

UNITED STATES PATENTS

| Number | Name | Date |
|---|---|---|
| 857,260 | Salyer | June 10, 1907 |
| 1,071,366 | Stephenson | Aug. 26, 1913 |
| 1,137,394 | Fowler | Apr. 27, 1915 |
| 1,564,392 | Williams | Dec. 8, 1925 |